(12) United States Patent
Xu et al.

(10) Patent No.: US 11,161,253 B2
(45) Date of Patent: Nov. 2, 2021

(54) RETRIEVING MAGNETICALLY ATTRACTED OBJECTS FROM SUBSTANTIALLY INACCESSIBLE CAVITIES

(71) Applicant: International Business Machines Corporation, Armonk, NY (US)

(72) Inventors: Junfeng Xu, Tucson, AZ (US); Albert Dennes, Tucson, AZ (US); Gregory Michael Ketterer, Tucson, AZ (US); Dave Bach, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 16/428,023

(22) Filed: May 31, 2019

(65) Prior Publication Data

US 2020/0376684 A1 Dec. 3, 2020

(51) Int. Cl.
*B25J 15/06* (2006.01)
*G01L 19/08* (2006.01)
(Continued)

(52) U.S. Cl.
CPC ....... *B25J 15/0608* (2013.01); *B25J 15/0023* (2013.01); *G01L 19/083* (2013.01); *H01F 7/206* (2013.01)

(58) Field of Classification Search
CPC .... B25J 15/0608; B25J 15/0023; B25J 15/12; B25J 19/02; G01L 19/083; H01F 7/206; H01F 7/0257
See application file for complete search history.

(56) References Cited

U.S. PATENT DOCUMENTS 4,575,143 A 3/1986 Nast
4,671,287 A * 6/1987 Fiddian-Green .... A61M 1/1678
600/363
(Continued)

FOREIGN PATENT DOCUMENTS

CN 105858358 B 5/2017
CN 206843096 U 1/2018

OTHER PUBLICATIONS

Gabelmann et al., "Percutaneous Retrieval of Lost or Misplaced Intravascular Objects," American Journal of Roentgenology, vol. 176, Jun. 2001, pp. 1509-1513.
(Continued)

*Primary Examiner* — Dean J Kramer
(74) *Attorney, Agent, or Firm* — Zilka-Kotab, P.C.

(57) ABSTRACT

An apparatus, according to one embodiment, includes: an electromagnetic shaft, an expandable balloon coupled to a first end of the shaft, and a fluid reservoir. A conduit also extends between the fluid reservoir and an interior of the balloon. The apparatus also includes a selectively magnetizable fluid, at least a portion of which is contained in the fluid reservoir, and a pump for selectively transferring the magnetizable fluid from the fluid reservoir to the balloon. A pressure sensor for detecting a pressure of the magnetizable fluid, and a controller for controlling the pump are further included. Moreover, at least a portion of the shaft is flexible. Other systems, methods, and computer program products are described in additional embodiments.

20 Claims, 8 Drawing Sheets

(51) Int. Cl.
*H01F 7/20* (2006.01)
*B25J 15/00* (2006.01)

(56) References Cited

U.S. PATENT DOCUMENTS

| | | | |
|---|---|---|---|
| 4,813,729 A | | 3/1989 | Speckhart |
| 5,348,359 A | * | 9/1994 | Boozer ................. B25J 1/02 |
| | | | 294/116 |
| 5,615,920 A | | 4/1997 | O'Kane et al. |
| 6,656,194 B1 | * | 12/2003 | Gannoe ............... A61F 5/0003 |
| | | | 604/96.01 |
| 9,849,596 B2 | * | 12/2017 | Bucknell ............. B25J 15/0023 |
| 10,022,875 B1 | | 7/2018 | Cowan |
| 2008/0108860 A1 | | 5/2008 | Bell et al. |
| 2011/0089708 A1 | * | 4/2011 | Mankame ............ B25J 9/1095 |
| | | | 294/86.4 |
| 2014/0228641 A1 | | 8/2014 | Gettman |
| 2014/0364865 A1 | | 12/2014 | Nishigishi |
| 2016/0052147 A1 | * | 2/2016 | Spicer ................. B23Q 3/1546 |
| | | | 269/8 |
| 2019/0030729 A1 | * | 1/2019 | Nagata ................. B25J 15/12 |

OTHER PUBLICATIONS

Wottawa et al., "Laparoscopic Grasper with an Integrated Tactile Feedback System," ICME International Conference on Complex Medical Engineering, Apr. 9-11, 2009, 5 pages.

* cited by examiner

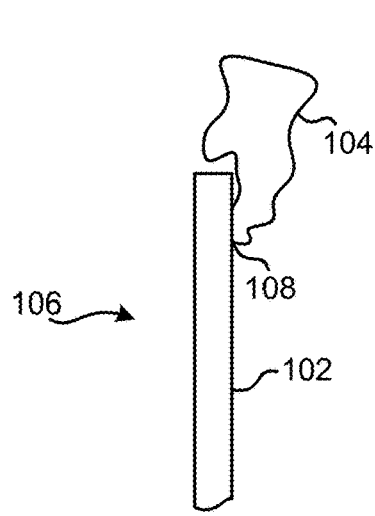
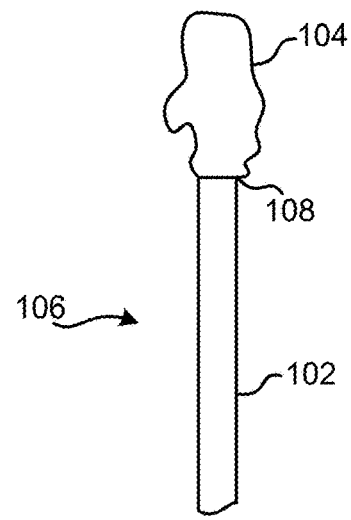
FIG. 1B FIG. 1C
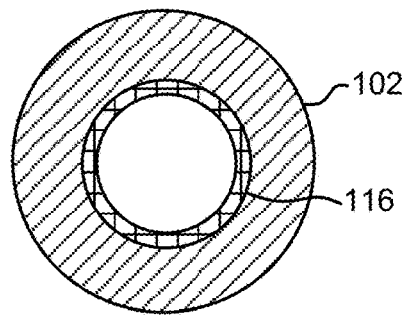
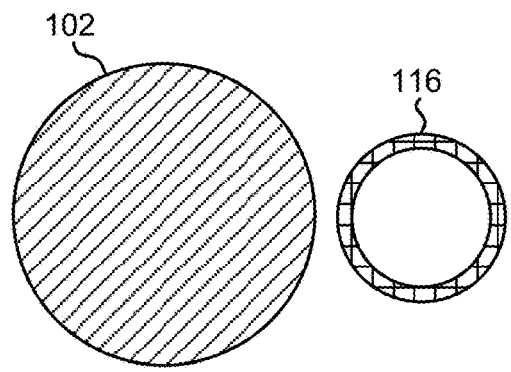
FIG. 1D FIG. 1E
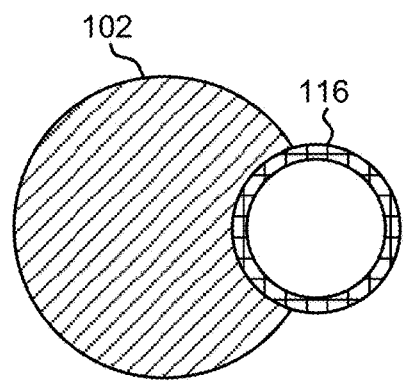
FIG. 1F

RETRIEVING MAGNETICALLY ATTRACTED OBJECTS FROM SUBSTANTIALLY INACCESSIBLE CAVITIES

BACKGROUND

The present invention relates to retrieval tools, and more specifically, this invention relates to retrieving magnetically attracted objects from substantially inaccessible cavities.

Retrieving objects that have fallen into, or otherwise entered, a cavity that is substantially inaccessible other than through a restricted opening can be difficult. While some existing tools are available to assist with gripping an object that is positioned in such a cavity, they are only applicable in a limited number of situations. For instance, a simple gripping tool would not be applicable in situations where the full extent of the cavity is obstructed from an individual's view, e.g., due to the general shape and/or orientation of the cavity.

While retrieving magnetically attracted objects does provide the opportunity to incorporate magnets in the retrieval process, existing solutions still fall short in that they are unable to efficiently probe the cavity in which the metallic object is located, again particularly in situations where the full extent of the cavity is obstructed from an individual's view. Moreover, a tool which the magnet is integrated with must be long enough to search the farthest extents of the cavity at which the metallic object may be positioned, which often times is not practical.

SUMMARY

An apparatus, according to one embodiment, includes: an electromagnetic shaft, an expandable balloon coupled to a first end of the shaft, and a fluid reservoir. A conduit also extends between the fluid reservoir and an interior of the balloon. The apparatus also includes a selectively magnetizable fluid, at least a portion of which is contained in the fluid reservoir, and a pump for selectively transferring the magnetizable fluid from the fluid reservoir to the balloon. A pressure sensor for detecting a pressure of the magnetizable fluid, and a controller for controlling the pump are further included. Moreover, at least a portion of the shaft is flexible.

A computer-implemented method, according to another embodiment, includes: instructing a pump to begin transferring a selectively magnetizable fluid from a fluid reservoir to an interior of an expandable balloon. The balloon is coupled to a first end of an electromagnetic shaft and at least a portion of the shaft is flexible. A conduit also extends between the fluid reservoir and an interior of the balloon. Pressure readings received from a pressure sensor are further used to determine whether a pressure of the selectively magnetizable fluid is outside a predetermined range. Accordingly, the pressure sensor is configured to detect a pressure of the magnetizable fluid. In response to determining that the pressure of the selectively magnetizable fluid is outside a predetermined range, the pump is instructed to stop transferring the selectively magnetizable fluid from the fluid reservoir to an interior of the balloon. Furthermore, the shaft and the selectively magnetizable fluid are magnetized.

A method for retrieving a magnetically attracted object from a cavity, according to yet another embodiment, includes: inserting an electromagnetic shaft into the cavity, where at least a portion of the shaft is flexible. Moreover, a pump is instructed to begin transferring a selectively magnetizable fluid from a fluid reservoir to an interior of an expandable balloon through a conduit which extends between the fluid reservoir and an interior of the balloon. The balloon is further coupled to a first end of an electromagnetic shaft. The method also includes waiting for the balloon to expand and subsequently return to a deflated state, and retrieving the electromagnetic shaft from the cavity.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 1B-1F are partial detailed views of alternate configurations of the components included in the apparatus of FIG. 1A, in accordance with several embodiments.

DETAILED DESCRIPTION

Figure 1A:
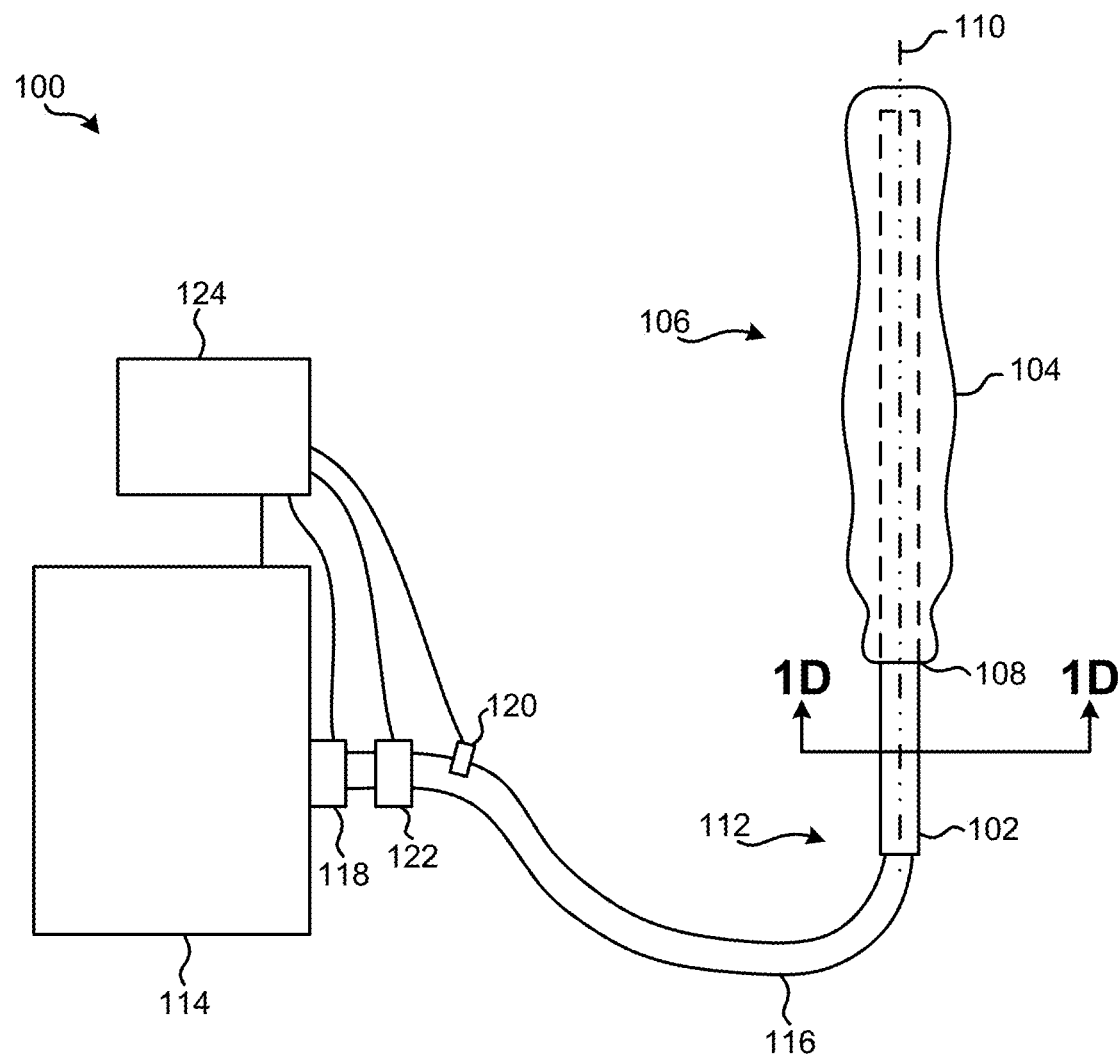
FIG. 1A is a representational view of an apparatus, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficiently retrieving magnetically attracted objects from substantially inaccessible cavities. Some of the apparatuses introduced herein are able to retrieve these magnetically attracted objects regardless of the general shape (e.g., layout) of the cavity, e.g., as will be described in further detail below.

In one general embodiment, an apparatus includes: an electromagnetic shaft, an expandable balloon coupled to a first end of the shaft, and a fluid reservoir. A conduit also extends between the fluid reservoir and an interior of the balloon. The apparatus also includes a selectively magnetizable fluid, at least a portion of which is contained in the fluid reservoir, and a pump for selectively transferring the magnetizable fluid from the fluid reservoir to the balloon. A pressure sensor for detecting a pressure of the magnetizable fluid, and a controller for controlling the pump are further included. Moreover, at least a portion of the shaft is flexible.

In another general embodiment, a computer-implemented method includes: instructing a pump to begin transferring a selectively magnetizable fluid from a fluid reservoir to an interior of an expandable balloon. The balloon is coupled to a first end of an electromagnetic shaft and at least a portion of the shaft is flexible. A conduit also extends between the fluid reservoir and an interior of the balloon. Pressure readings received from a pressure sensor are further used to determine whether a pressure of the selectively magnetizable fluid is outside a predetermined range. Accordingly, the pressure sensor is configured to detect a pressure of the magnetizable fluid. In response to determining that the pressure of the selectively magnetizable fluid is outside a predetermined range, the pump is instructed to stop transferring the selectively magnetizable fluid from the fluid reservoir to an interior of the balloon. Furthermore, the shaft and the selectively magnetizable fluid are magnetized.

In yet another general embodiment, a method for retrieving a magnetically attracted object from a cavity includes: inserting an electromagnetic shaft into the cavity, where at least a portion of the shaft is flexible. Moreover, a pump is instructed to begin transferring a selectively magnetizable fluid from a fluid reservoir to an interior of an expandable balloon through a conduit which extends between the fluid reservoir and an interior of the balloon. The balloon is further coupled to a first end of an electromagnetic shaft. The method also includes waiting for the balloon to expand and subsequently return to a deflated state, and retrieving the electromagnetic shaft from the cavity.

As previously mentioned, retrieving objects that have fallen into, or otherwise entered, a cavity that is substantially inaccessible other than through a restricted opening can be difficult. While some existing tools are available to assist with gripping an object that is positioned in such a cavity, they are only applicable in a limited number of situations. For instance, a simple gripping tool would not be applicable in situations where the full extent of the cavity is obstructed from an individual's view, e.g., due to the general shape and/or orientation of the cavity.

While retrieving magnetically attracted objects does provide the opportunity to incorporate magnets in the retrieval process, existing solutions still fall short in that they are unable to efficiently probe the cavity in which the metallic object is located, again particularly in situations where the full extent of the cavity is obstructed from an individual's view. Moreover, a tool which the magnet is integrated with must be long enough to search the farthest extents of the cavity at which the metallic object may be positioned, which often times is not practical.

In sharp contrast to these conventional shortcomings, various ones of the embodiments included herein introduce apparatuses which are capable of efficiently retrieving magnetically attracted objects from substantially inaccessible cavities. Some of the apparatuses introduced herein are able to retrieve these magnetically attracted objects regardless of the general shape (e.g., layout) of the cavity. These apparatuses also desirably have a lower profile than conventional tools having similar intended functionality, thereby allowing for a smaller overall footprint, e.g., as will be described in further detail below.

Looking now to FIG. 1A, an apparatus 100 for receiving magnetically attracted objects from a substantially inaccessible cavity is depicted in accordance with one embodiment. As an option, the present apparatus 100 may be implemented in conjunction with features from any other embodiment listed herein, such as those described with reference to the other FIGS. However, such apparatus 100 and others presented herein may be used in various applications and/or in permutations which may or may not be specifically described in the illustrative embodiments listed herein. Further, the apparatus 100 presented herein may be used in any desired environment. Thus FIG. 1A (and the other FIGS.) may be deemed to include any possible permutation.

As show, the apparatus 100 includes an electromagnetic shaft 102 which has an expandable balloon 104 coupled to a first end 106 of the shaft 102. According to the present approach, a mouth 108 of the balloon 104 is coupled to an outer surface of the shaft 102 along its length which extends along the longitudinal axis 110 thereof. The mouth 108 of the balloon 104 is preferably coupled to the outer surface of the shaft 102 such that an interior of the balloon 104 is sealed from the surrounding environment. Therefore, any contents placed in the interior of the balloon 104 are prevented from escaping at the interface between the mouth 108 of the balloon 104 and the outer surface of the shaft 102, e.g., as will soon become apparent.

Depending on the approach, the mouth 108 of the balloon 104 is coupled to the outer surface of the shaft 102 using an adhesive, a groove in the outer surface of the shaft 102, friction, etc. The specific location along the length of the shaft 102 that the mouth 108 of the balloon 104 is coupled to also varies depending on the specific approach. For instance, in some approaches the mouth 108 of the balloon 104 encircles the outer surface of the shaft 102 as illustrated in FIG. 1A. Yet referring momentarily to FIGS. 1B-1C, in other approaches the mouth 108 of the balloon 104 may be integrated into the side of the shaft 102 (e.g., see FIG. 1B), or an outermost portion of the shaft 102 (e.g., see FIG. 1C). However, the balloon 104 may be coupled to the shaft 102 in any other manner which would be apparent to one skilled in the art after reading the present description.

Returning to FIG. 1A, at least a portion of the shaft 102 is also preferably flexible. In other words, at least a portion of the shaft 102 may be selectively deformed in response to applying an external force thereto. However, the flexible portion of the shaft 102 is also resiliently deformable in some approaches such that any deformations made to the flexible portion of the shaft 102 are not permanent. In other words, the shaft 102 may be bent upon applying an external force thereto, but returns to a nominal "resting" shape upon removing the external force. The shaft 102 may be configured in other approaches such that the length of the shaft 102 retains its general shape in response to an external force being applied thereto until a subsequent external force is exerted on the shaft 102, causing it to assume a different general shape along its length.

As mentioned above, the shaft 102 is also electromagnetic in the present embodiment. In other words, the shaft 102 is able to produce a magnetic field in response to being supplied with an electric current. It follows that the shaft 102 includes an electrically conductive material, e.g., such as a metallic, in such a way that does not hinder the flexibility of the shaft 102 itself. For example, the shaft 102 may include a flexible substrate material, e.g., such as rubber, which is encased in an electrically conductive material, e.g., such as a braded metallic hose, thereby resulting in a flexible, yet electromagnetic shaft 102. However, it should be noted that none of the illustrative approaches described herein are intended to limit the invention. Rather, any desired type and/or configuration of materials which would be apparent to one skilled in the art after reading the present description may be implemented herein.

With continued reference to FIG. 1A, a second end 112 of the shaft 102 is coupled to a fluid reservoir 114. Although the second end 112 of the shaft 102 is coupled to the fluid reservoir 114 by a conduit 116 which extends therebetween in the present embodiment, this is in no way intended to be limiting. For instance, in other approaches the shaft 102 may extend such that the second end 112 of the shaft 102 is coupled directly to the reservoir 114.

Like the shaft 102, the conduit 116 is preferably flexible to increase ease of use for a user. The conduit 116 also extends from the fluid reservoir 114 to the interior of the balloon 104 in some approaches. For example, in some approaches the shaft 102 is hollow and the conduit 116 is integrated in the hollow portion of the shaft such that at least a portion of the conduit extends through the hollow portion of the shaft, e.g., as shown in the detailed view of FIG. 1D. However, in other approaches the conduit 116 may extend alongside the outer surface of the shaft 102 (e.g., see FIG. 1E), along a groove in the outer surface of the shaft 102 (e.g., see FIG. 1F), etc.

In other approaches the conduit 116 may not extend to the interior of the balloon 104. For example, an end of the conduit 116 is integrated with the second end of the hollow shaft 102 such that any substances delivered to the second end of the hollow shaft 102 are transferred to the interior of the balloon 104 by the hollow shaft 102 in some approaches. However, in some approaches the apparatus 100 may not include the conduit 116 at all such that the hollow shaft 102 extends all the way back to the fluid reservoir 114.

Referring back to the fluid reservoir 114, at least a subset of a selectively magnetizable fluid (e.g., a "ferrofluid") included in the apparatus 100 is stored therein. The amount of selectively magnetizable fluid included in the fluid reservoir 114 and/or the apparatus 100 as a whole is preferably limited to an amount which is capable of being transferred to the interior of the balloon 104 without causing damage thereto. In other words, although the balloon 104 is expandable (e.g., flexible), there is an upper limit to the amount of a substance it can hold before becoming damaged, e.g., such as bursting, detaching from the shaft 102, etc.

According to an exemplary approach, which is in no way intended to limit the invention, the selectively magnetizable fluid (e.g., see 308 in FIG. 3C below) includes a plurality of ferromagnetic particles which are suspended in a carrier fluid, e.g., such as an organic solvent, water, etc. The plurality of ferromagnetic particles are also preferably coated with a surfactant which inhibits the ferromagnetic particles from clumping together in the carrier fluid. Preferably, the Van der Waals repulsive force of the surfactant coating exceeds the magnetic attraction of the ferromagnetic particles and keeps the ferromagnetic particles from clumping together.

An illustrative list of materials which may be included in at least some of the plurality of ferromagnetic particles includes, but is in no way limited to, magnetite, hematite, iron, etc., or any other ferromagnetic material which would be apparent to one skilled in the art after reading the present description. Moreover, an illustrative list of compounds which may be included in the surfactant includes, but is in no way limited to, oleic acid, tetramethylammonium hydroxide, citric acid, soy lecithin, etc., or any other type of surfactants which would be apparent to one skilled in the art after reading the present description.

In some approaches, each of the ferromagnetic particles is also preferably sufficiently small so as to prevent the clumping of these particles, e.g., the particle size is small enough that the gravitational force does not overpower the Brownian motion and the ferromagnetic particles stay in suspension rather than settling out. According to some approaches, each of the plurality of ferromagnetic particles are between about 1 and about 100 nanometers (nm) in size, measured along their largest dimensional side, respectively.

The concentration of ferromagnetic particles in the selectively magnetizable fluid should be sufficient to provide a measurable magnetic field upon magnetization of the selectively magnetizable fluid. In preferred embodiments, the concentration of ferromagnetic particles in the selectively magnetizable fluid is close to saturation, but not exceeding the maximum concentration that the fluid pump is capable of pumping in and out.

A mechanical fluid pump 118 is also coupled between the conduit 116 and the fluid reservoir 114 in FIG. 1A. The pump 118 is preferably configured to selectively transfer the magnetizable fluid from the fluid reservoir 114 to the interior of the balloon 104, e.g., using hydraulics. The pump 118 is also configured to selectively transfer the magnetizable fluid from the interior of the balloon 104 back into the fluid reservoir 114 in some approaches. However, in other approaches the magnetizable fluid is able to selectively flow from the interior of the balloon 104 back into the fluid reservoir 114 without relying on the pump 118. For instance, an elasticity of the expandable balloon 104 may be sufficiently high such that the magnetizable fluid is forced back into the fluid reservoir 114 in the absence of any pressure forces caused by the pump 118. According to another example, the force of gravity may at least assist in returning the magnetizable fluid back into the fluid reservoir 114.

The apparatus 100 additionally includes a pressure sensor 120. In some approaches, the pressure sensor 120 is able to detect a pressure of the magnetizable fluid while the fluid is in the conduit 116 and consequently in the interior of the balloon 104. Although the pressure sensor 120 is depicted as being integrated in the conduit 116 in FIG. 1A, it should be noted that this is in no way intended to be limiting. For example, the pressure sensor 120 may be integrated in the shaft 102, integrated in the pump 118, positioned in the interior of the balloon 104, etc. depending on the desired approach. Moreover, the pressure sensor 120 may include any type of pressure sensor which would be apparent to one skilled in the art after reading the present description.

A flowmeter 122 is also coupled to the conduit 116 in the present embodiment. The flowmeter 122 is thereby able to measure the amount of the magnetizable fluid which has flowed out of and/or back into the fluid reservoir 114 through the conduit 116. Moreover, the flowmeter 122 may be of any type which would be apparent to one skilled in the art after reading the present description.

Further still, apparatus 100 includes a controller 124 which is coupled to a number of the other components included in the apparatus 100. For instance, the controller 124 is coupled to the pump 118, the pressure sensor 120 and the flowmeter 122 by one or more physical electrical connections, e.g., such as wires, cables, fiber-optic links, etc. However, any one or more of the components may also or alternatively be connected by a wireless connection, e.g., WiFi, Bluetooth, a cellular network, etc., or any other type of connection which would be apparent to one skilled in the art after reading the present description. Accordingly, commands, instructions, requests, etc., may be received by the controller 124 from any of the components connected thereto and/or sent from the controller 124 to any of the components connected thereto. At least some of these commands, instructions, requests, etc. allow for the controller 124 to control the components which are connected thereto. For instance, in some approaches the controller 124 determines when and how to engage the mechanical fluid pump 118. According to another approach, the controller 124 selectively controls the electromagnetic switching of the shaft 102 based on various factors, e.g., as will soon become apparent.

Figure 2:
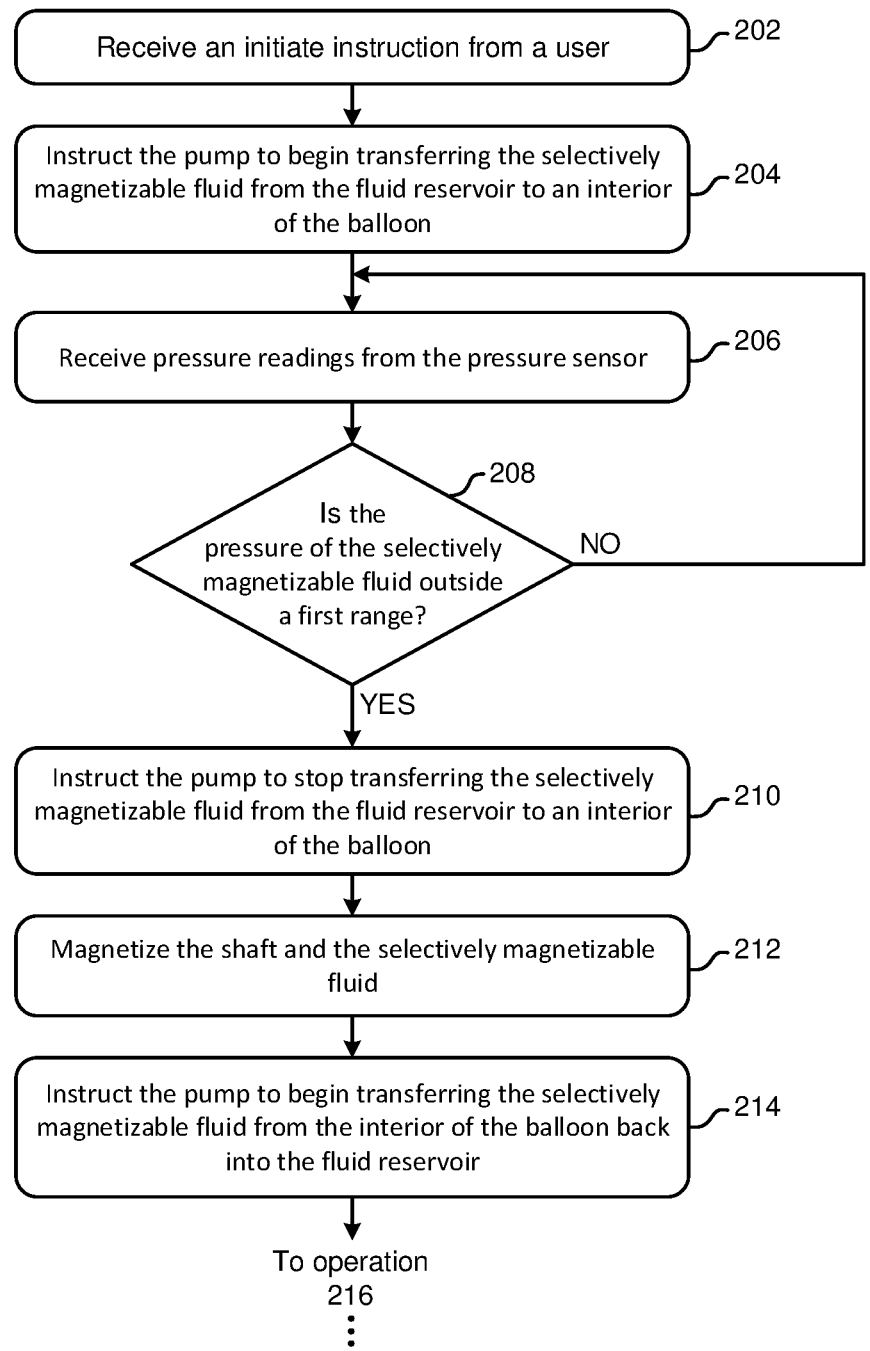
FIG. 2 is a flowchart of a method, in accordance with one embodiment.
Figure 2:
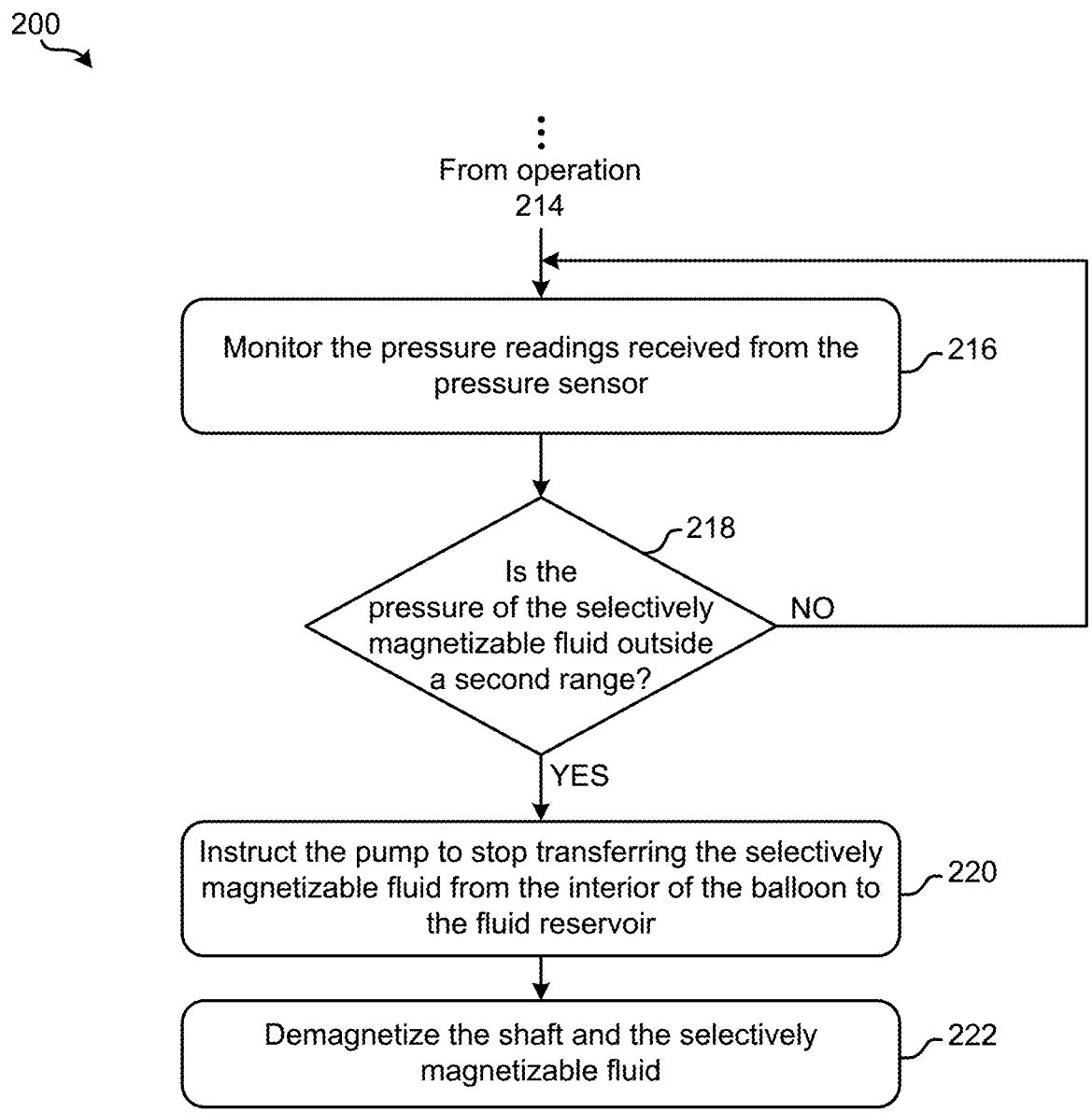

Moreover, the controller 124 manages performance of the various components according to a method of operation for the apparatus 100 in some approaches. For example, FIG. 2 presents a flowchart of a method 200 for controlling the operation of an apparatus, in accordance with one embodiment. Accordingly, various ones of the processes included in method 200 have been presented in the context of the apparatus 100 depicted in FIG. 1A. However, the method 200 may be performed in accordance with the present invention in any of the environments presented herein, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a controller, a microcontroller, a processor, a computer, etc., or some other device having one or more processors therein. Thus, in some embodiments, method 200 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, operation 202 of method 200 includes receiving an initiate instruction from a user. The initiate instruction is received in response to the user providing a physical and/or logical input to the controller performing method 200. According to some approaches, an initiate instruction is received in response to the user depressing a physical switch, engaging a push-button, physically flipping a toggle, etc. In other approaches, the initiate instruction is received in response to the user selecting a logical button on a display screen integrated with the apparatus, sending a logical signal to the controller through a network (e.g., using a mobile app), etc.

In response to receiving the initiate instruction, method 200 includes instructing the pump to begin transferring the selectively magnetizable fluid from the fluid reservoir to an interior of the balloon. See operation 204. In other words, the controller instructs the mechanical fluid pump to begin filling the balloon with the selectively magnetizable fluid by pumping the fluid from the reservoir, into the conduit which eventually delivers the fluid to the interior of the balloon. It should again be noted that the specific manner in which the selectively magnetizable fluid is delivered to the interior of the balloon from the fluid reservoir depends on the particular configuration of the various components in the apparatus. For example, FIGS. 1B-1F above illustrate several examples of how the conduit, the shaft and the balloon may be integrated with each other.

As the pump is transferring the selectively magnetizable fluid from the fluid reservoir to an interior of the balloon, the balloon begins to fill. The expandable properties of the material used to form the balloon allow for the volume of the balloon to increase as the fluid continues to enter its interior. In order to avoid overfilling the balloon with the selectively magnetizable fluid, the controller receives pressure readings from the pressure sensor. See operation 206. These pressure readings that are received indicate the pressure of the subset of selectively magnetizable fluid positioned in the interior of the balloon as well as in the conduit and electromagnetic shaft. Accordingly, the controller is able to monitor the pressure of the selectively magnetizable fluid and determine whether the pressure is outside a first given range. See decision 208.

Depending on the approach, the first range may be predetermined by a user, the company that manufactured the apparatus, etc. based on industry standards, performance capabilities of the various components included in the apparatus, the specific type of selectively magnetizable fluid used, etc. Yet in other approaches, the first range may be adjusted based on preferences, specific use cases, real-time performance data, etc. It should also be noted that "outside a first given range" is in no way intended to limit the invention. Rather than determining whether a value is outside a first range, equivalent determinations may be made, e.g., as to whether a value is above a threshold, whether a value is within a predetermined range, whether an absolute value is above a threshold, whether a value is below a threshold, etc., depending on the desired approach.

In response to determining that the pressure of the selectively magnetizable fluid is still in the first range, method 200 returns to operation 206 and continues monitoring the pressure readings being received from the pressure sensor. It follows that processes 206 and 208 may be repeated in an iterative fashion any number of times until the pressure of the selectively magnetizable fluid is determined to no longer be in the first range. However, in some approaches a limit may be set in terms of the number of times processes 206 and 208 may be repeated. Accordingly, the apparatus is capable of avoiding situations where the pump is run an unnecessarily long time. For example, a leak in the apparatus may be inferred in response an amount of time the pump spends moving the selectively magnetizable fluid out of the fluid reservoir, specific pressure profiles (e.g., a sharp pressure drop-off), etc. Moreover, this limit may depend on how quickly processes 206 and 208 are actually performed, the performance characteristics of the expandable balloon material, an achievable flowrate of the pump, etc.

Returning to decision 208, method 200 proceeds to operation 210 in response to determining that the pressure of the selectively magnetizable fluid is outside the predetermined first range. There, operation 210 includes instructing the pump to stop transferring the selectively magnetizable fluid from the fluid reservoir to an interior of the balloon. Moreover, operation 212 includes magnetizing the shaft and the selectively magnetizable fluid. As mentioned above, the shaft of the apparatus is electromagnetic. The shaft may thereby be selectively magnetized by applying an electrical current thereto. In some approaches, this electrical current may be provided by a current supply coupled to and/or integrated with the controller.

The magnetic field produced by the shaft once it has been magnetized causes the selectively magnetizable fluid to become magnetized as well. As mentioned above, the selectively magnetizable fluid includes a plurality of ferromagnetic particles which are suspended in a carrier fluid.

Accordingly, the ferromagnetic particles interact with the magnetic field generated by the magnetized shaft, becoming magnetized themselves. Once magnetized, the shaft and fluid are able to couple to metallic objects that are attracted by magnetic fields emanating from magnetic objects. Accordingly, the apparatus may be used to recover certain objects which may otherwise be irretrievable. According to an in-use embodiment, which is in no way intended to limit the invention, FIGS. 3A-3E below depict a method for using an apparatus according to some of the approaches described herein to retrieve a magnetically attracted object from a substantially inaccessible cavity. The expandable nature of the balloon coupled with the selectively magnetic properties of the shaft and fluid allow for the apparatus to be deployed in a number of situations that would otherwise render an object irretrievable, e.g., as will be described in further detail below.

Returning to method 200, the magnetic shaft and magnetic fluid are given an ample amount of time to magnetically couple to any magnetically attracted objects that are within reach of the magnetic field generated by the shaft and fluid. See operation 212. Moreover, operation 214 includes instructing the pump to begin transferring the selectively magnetizable fluid from the interior of the balloon back into the fluid reservoir. As the fluid is being returned to the reservoir by the pump, method 200 continues to monitor the pressure readings received from the pressure sensor. See operation 216.

As noted above, these pressure readings that are received indicate the pressure of the subset of selectively magnetizable fluid positioned in the interior of the balloon as well as in the conduit and electromagnetic shaft. Accordingly, the controller is able to monitor the pressure of the selectively magnetizable fluid and determine whether it is outside a second given range. See decision 218. The first range and the second range are different from each other, e.g., as evidenced by what each of them represent. For instance, while the first range is used to determine when the balloon has expanded to fill substantially all of its surrounding environment (e.g., again refer to FIGS. 3A-3E below), the second range is used to determine when a desired amount of the selectively magnetizable fluid has been returned to the reservoir.

Moreover, as mentioned above, the second range may be predetermined by a user, the company that manufactured the apparatus and/or pump, etc. based on industry standards, performance capabilities of the various components included in the apparatus, the specific type of selectively magnetizable fluid used, etc. Yet in other approaches, the second range may be adjusted based on preferences, specific use cases, real-time performance data, etc. It should also be noted that "outside a first given range" is in no way intended to limit the invention. Rather than determining whether a value is outside a second range, equivalent determinations may be made, e.g., as to whether a value is above a threshold, whether a value is within a predetermined range, whether an absolute value is above a threshold, whether a value is below a threshold, etc., depending on the desired approach.

In still other approaches, different information may be used to determine whether a desired amount of the selectively magnetizable fluid has been transferred from and/or returned to the reservoir. For example, flow readings received from a flowmeter coupled to the conduit (e.g., see 122 of FIG. 1A above) may be used to determine an amount of the fluid that has been transferred from the reservoir to the interior of the balloon. Similarly, the flow readings may be used to determine whether the same amount of the selectively magnetizable fluid has been returned to the fluid reservoir. Therefore, the pump may be turned off in response to determining that a certain amount of the selectively magnetizable fluid has been returned to the fluid reservoir in some approaches.

Referring still to decision 218, method 200 returns to operation 216 in response to determining that the pressure of the selectively magnetizable fluid is not outside the second predetermined range. Upon returning to operation 216, method 200 continues monitoring the pressure readings being received from the pressure sensor. It follows that processes 216 and 218 may be repeated in an iterative fashion any number of times until the pressure of the selectively magnetizable fluid is determined to have fallen into the second range. However, in some approaches a limit may be set in terms of the number of times processes 216 and 218 may be repeated. Accordingly, the apparatus is capable of avoiding situations where the pump is run an unnecessarily long time, e.g., as described above.

Returning to decision 218, method 200 proceeds to operation 220 in response to determining that the pressure of the selectively magnetizable fluid is outside the second predetermined range. There, operation 220 includes instructing the pump to stop transferring the selectively magnetizable fluid from the interior of the balloon to the fluid reservoir. In other words, operation 220 includes turning off the pump. Moreover, operation 222 includes demagnetizing the shaft and the selectively magnetizable fluid, whereby method 200 may end. However, it should be noted that although method 200 may end upon reaching operation 222, any one or more of the processes included in method 200 may be repeated in response to receiving another initiate instruction from a user.

It should also be noted that although method 200 relies on a pump to transfer the selectively magnetizable fluid from the reservoir to the interior of the balloon and vice versa, this is in no way intended to be limiting. Rather, the fluid may be moved throughout the apparatus differently in other approaches. For instance, in some approaches an expandable balloon that is relatively difficult to expand (e.g., due to the material composition thereof) may return to a deflated state in the absence of any forces caused by the pump. In other words, the balloon may be particularly resistant to deformation (expansion), thereby returning to a nominal, uninflated state as soon as the pump is turned off. As a result, the selectively magnetizable fluid is returned to the reservoir through the conduit without the aid of the pump.

Looking now to FIGS. 3A-3E, a method 300 of using an apparatus to retrieve a magnetically attracted object from a substantially inaccessible cavity is illustrated in accordance with an in-use example. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions. Moreover, FIGS. 3A-3E illustrate variations of the embodiment of FIG. 1A depicting several exemplary uses of the apparatus 100. Accordingly, various components of FIGS. 3A-3E have common numbering with those of FIG. 1A.

Figure 3A:
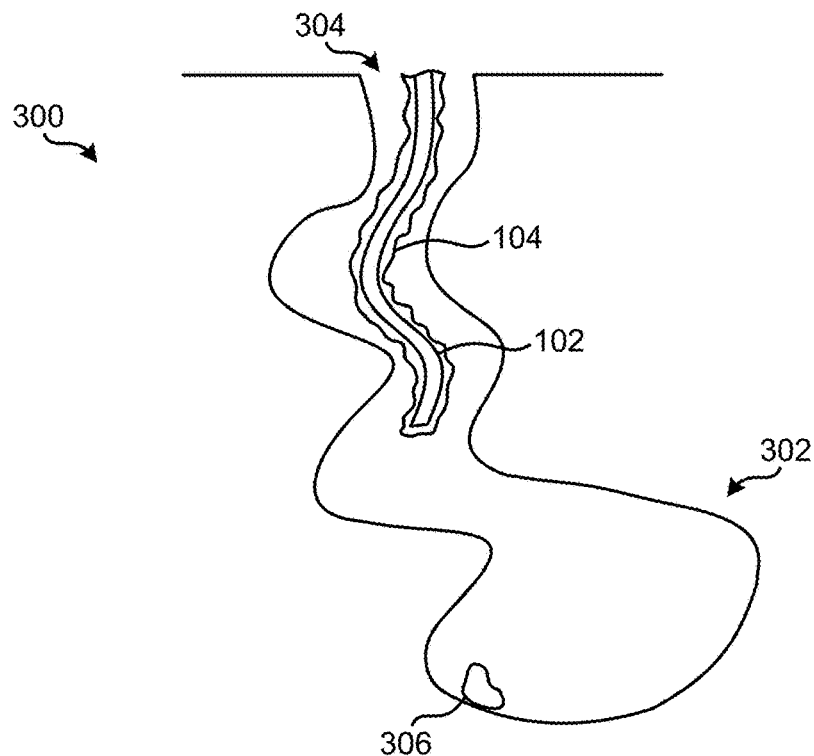
FIGS. 3A-3E are representational views of a method, in accordance with one in-use example.

As shown in FIG. 3A, method 300 includes inserting an electromagnetic shaft 102 into the substantially inaccessible cavity 302 through a restricted entry point 304. As described above, at least a portion of the shaft 102 is flexible (e.g., resiliently deformable), thereby allowing for the shaft 102 to maneuver around any obstructions in the cavity 302.

Figure 3B:
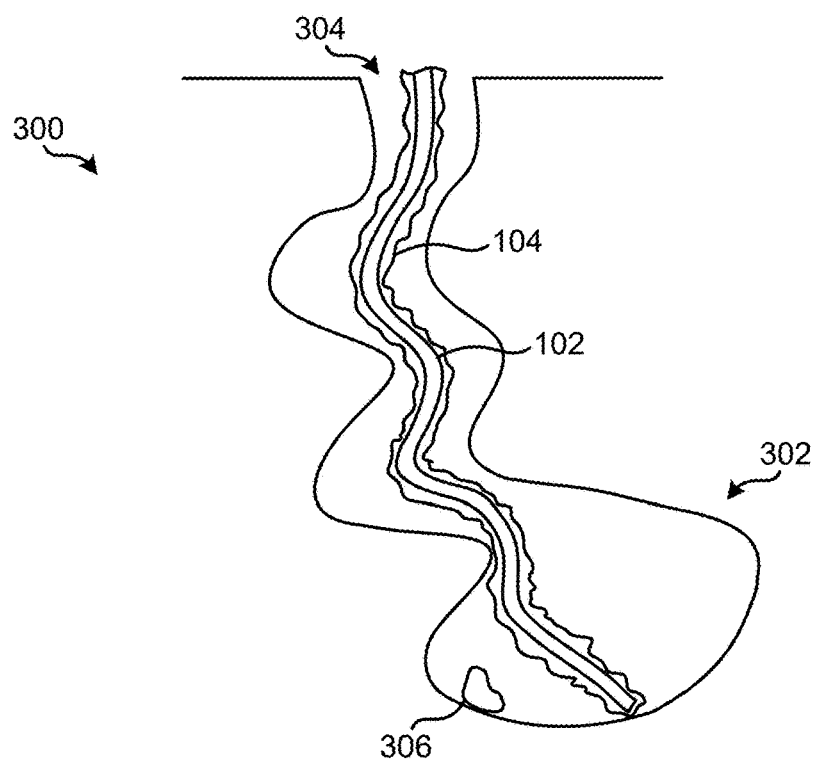

Once the electromagnetic shaft 102 has been inserted such that at least a portion of the shaft 102 and expandable balloon 104 are positioned adjacent the object 306 being retrieved, e.g., as seen in FIG. 3B, method 300 includes instructing a pump (e.g., see 118 of FIG. 1A) to begin transferring the selectively magnetizable fluid from a fluid reservoir (e.g., see 114 of FIG. 1A) to an interior of the expandable balloon 104. As described above, the selectively magnetizable fluid is transferred to the interior of the expandable balloon 104 at least partially through a conduit (e.g., see 116 of FIG. 1A) which extends between the fluid reservoir and an interior of the balloon 104. However, the conduit is preferably integrated with the shaft 102 in some way (e.g., see FIGS. 1D-1F) and therefore the selectively magnetizable fluid is transferred to the interior of the expandable balloon 104 through the shaft 102 as well in many approaches.

Figure 3C:
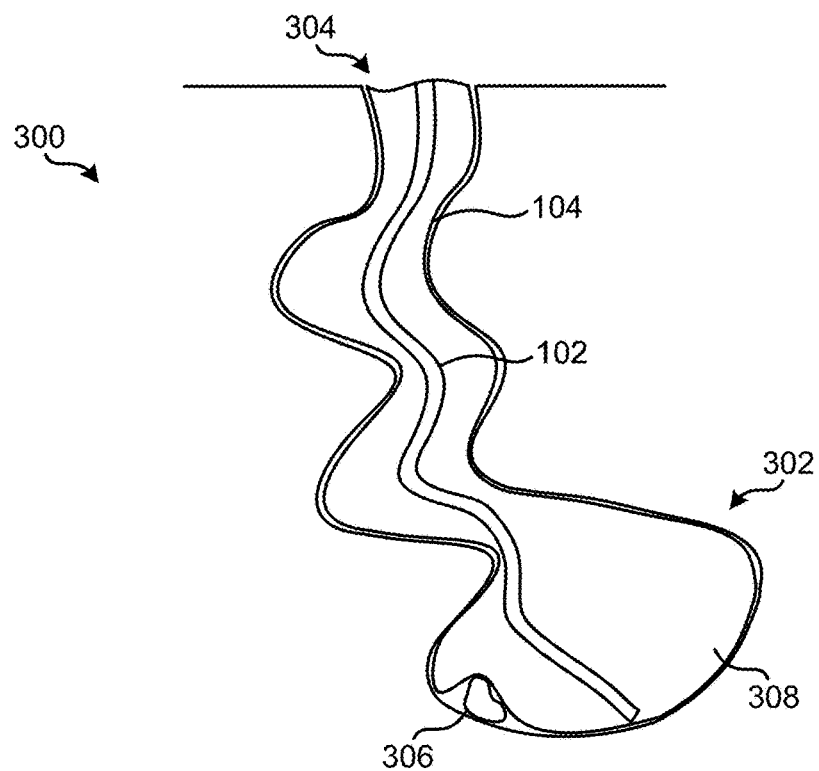
Figure 3D:
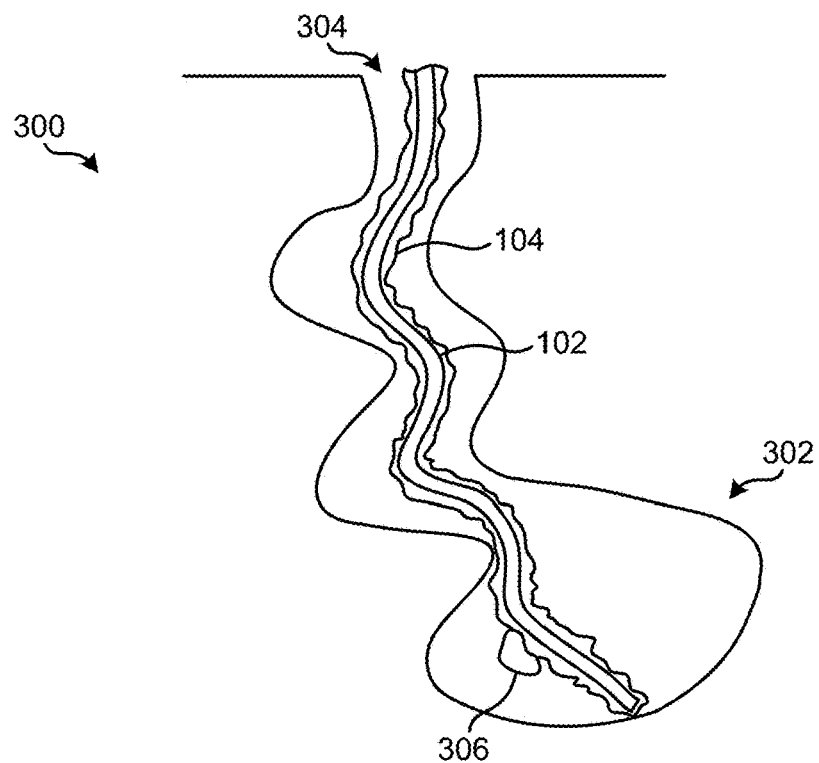

Proceeding to FIGS. 3C-3D, method 300 further includes waiting for the balloon 104 to expand and subsequently return to a deflated state. Looking specifically to FIG. 3C, the balloon 104 continues to expand as the fluid 308 continues to enter the balloon 104 until the cavity 302 has been filled, causing the pressure of the magnetizable fluid in the balloon to spike. As mentioned above, this pressure spike is interpreted by the controller in the apparatus as the balloon 104 filling the cavity 302 whereby the pump is turned off. The shaft 102 is then magnetized which causes the fluid 308 to become magnetized as well. The magnetic field generated by the magnetized shaft 102 and fluid 308 thereby attracts the metallic object 306 which becomes coupled to the surface of the balloon 104. As shown in FIG. 3D, the object 306 remains coupled to the surface of the balloon 104 even after the balloon 104 has reached a deflated state.

Figure 3E:
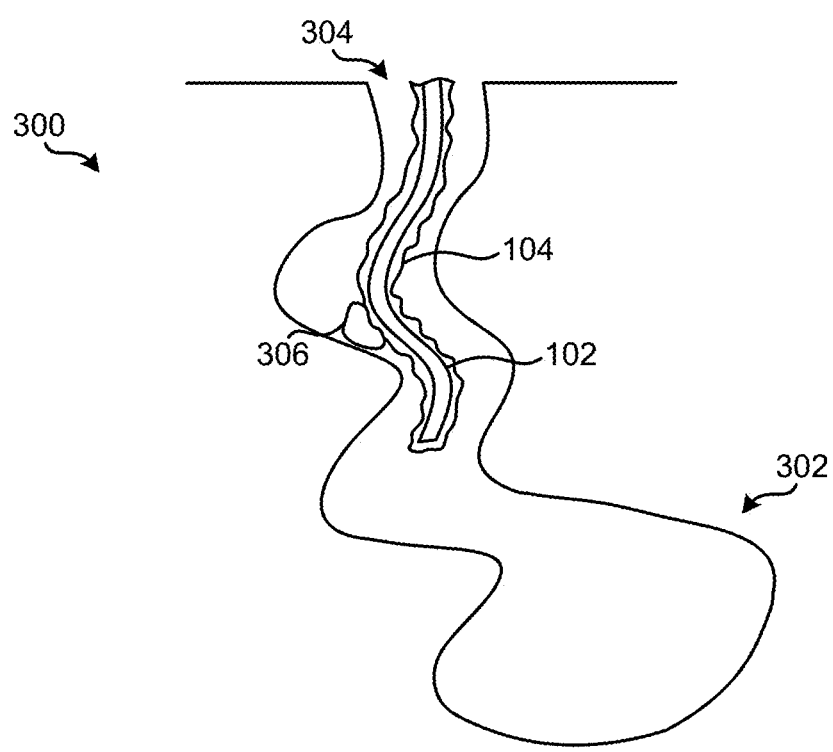

In response to the balloon 104 reaching a deflated state, the electromagnetic shaft 102 is retrieved from the substantially inaccessible cavity 302 as illustrated in FIG. 3E. Moreover, once the shaft 102 has been retrieved, a user may instruct the controller (e.g., see 124 of FIG. 1A) to demagnetize the shaft 102 and the selectively magnetizable fluid 308, thereby releasing the metallic object 306 which has been successfully retrieved.

Figure 4:
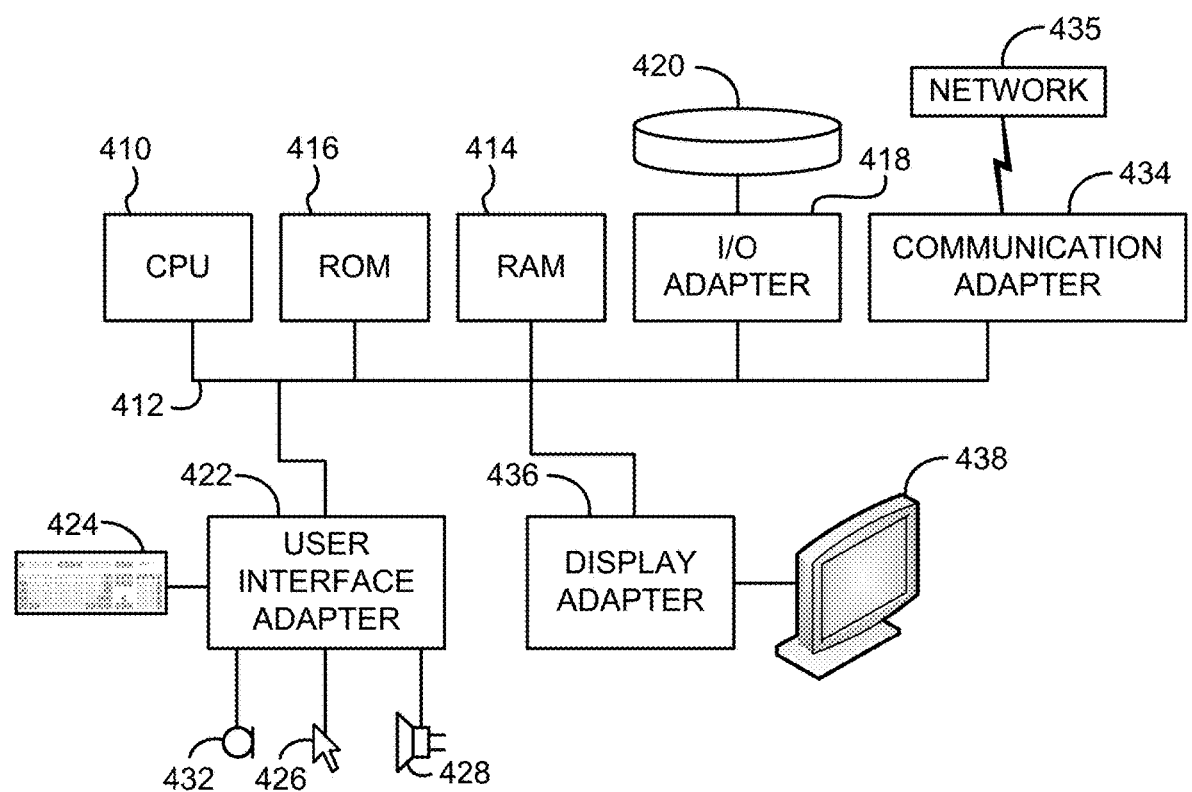
FIG. 4 is a representational view of a hardware environment, in accordance with one embodiment.

Although various ones of the approaches above have been introduced with respect to the components included in an apparatus, it should be noted that this is in no way intended to limit the invention. Rather any desired number of components in any desired configuration may be implemented. For instance, FIG. 4 illustrates a representative hardware environment associated with a user device and/or server, in accordance with one embodiment. Such figure illustrates a typical hardware configuration of a workstation having a central processing unit 410, such as a microprocessor, and a number of other units interconnected via a system bus 412.

The workstation shown in FIG. 4 includes a Random Access Memory (RAM) 414, Read Only Memory (ROM) 416, an input/output (I/O) adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen and a digital camera (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
an electromagnetic shaft, wherein at least a portion of the shaft is flexible;
an expandable balloon coupled to a first end of the shaft;
a fluid reservoir;
a conduit extending between the fluid reservoir and an interior of the balloon;
a selectively magnetizable fluid, at least a portion of which is contained in the fluid reservoir;
a pump for selectively transferring the magnetizable fluid from the fluid reservoir to the balloon;
a pressure sensor for detecting a pressure of the magnetizable fluid; and
a controller for controlling the pump.

2. The apparatus of claim 1, comprising:
logic integrated with the controller, executable by the controller, or integrated with and executable by the controller, the logic being configured to:

instruct the pump to begin transferring the selectively magnetizable fluid from the fluid reservoir to an interior of the balloon, use pressure readings received from the pressure sensor to determine whether a pressure of the selectively magnetizable fluid is outside a predetermined range, in response to determining that the pressure of the selectively magnetizable fluid is outside a predetermined range, instruct the pump to stop transferring the selectively magnetizable fluid from the fluid reservoir to an interior of the balloon, and magnetize the shaft and the selectively magnetizable fluid.

3. The apparatus of claim 2, the logic being configured to:

instruct the pump to begin transferring the selectively magnetizable fluid from the interior of the balloon back into the fluid reservoir, use pressure readings received from the pressure sensor to determine whether the pressure of the selectively magnetizable fluid is outside a second predetermined range, and in response to determining that the pressure of the selectively magnetizable fluid is outside the second predetermined range, instruct the pump to stop transferring the selectively magnetizable fluid from the interior of the balloon to the fluid reservoir.

4. The apparatus of claim 2, comprising:

a flowmeter coupled to the conduit, wherein the logic is configured to:

instruct the pump to begin transferring the selectively magnetizable fluid from the interior of the balloon back into the fluid reservoir, use flow readings received from the flowmeter to determine whether a predetermined amount of the selectively magnetizable fluid has been returned to the fluid reservoir, and in response to determining that a predetermined amount of the selectively magnetizable fluid has been returned to the fluid reservoir, instruct the pump to stop transferring the selectively magnetizable fluid from the interior of the balloon to the fluid reservoir.

5. The apparatus of claim 1, wherein the selectively magnetizable fluid includes a plurality of ferromagnetic particles which are suspended in a carrier fluid, wherein the plurality of ferromagnetic particles are coated with a surfactant.

6. The apparatus of claim 5, wherein the plurality of ferromagnetic particles include a material selected from the group consisting of: magnetite, hematite, and iron.

7. The apparatus of claim 6, wherein the surfactant includes a compound selected from the group consisting of: oleic acid, tetramethylammonium hydroxide, citric acid, and soy lecithin.

8. The apparatus of claim 1, wherein the shaft is hollow and the conduit is integrated in the hollow portion of the shaft.

9. A computer-implemented method, comprising:

instructing a pump to begin transferring a selectively magnetizable fluid from a fluid reservoir to an interior of an expandable balloon, wherein the balloon is coupled to a first end of an electromagnetic shaft, wherein at least a portion of the shaft is flexible, wherein a conduit extends between the fluid reservoir and an interior of the balloon;

using pressure readings received from a pressure sensor to determine whether a pressure of the selectively magnetizable fluid is outside a predetermined range, wherein the pressure sensor is configured to detect a pressure of the magnetizable fluid;

in response to determining that the pressure of the selectively magnetizable fluid is outside a predetermined range, instructing the pump to stop transferring the selectively magnetizable fluid from the fluid reservoir to an interior of the balloon; and magnetizing the shaft and the selectively magnetizable fluid.

10. The computer-implemented method of claim 9, comprising:

instructing the pump to begin transferring the selectively magnetizable fluid from the interior of the balloon back into the fluid reservoir;

using pressure readings received from the pressure sensor to determine whether the pressure of the selectively magnetizable fluid is outside a second predetermined range; and in response to determining that the pressure of the selectively magnetizable fluid is outside the second predetermined range, instructing the pump to stop transferring the selectively magnetizable fluid from the interior of the balloon to the fluid reservoir.

11. The computer-implemented method of claim 9, comprising:

instructing the pump to begin transferring the selectively magnetizable fluid from the interior of the balloon back into the fluid reservoir;

using flow readings received from a flowmeter coupled to the conduit to determine whether a predetermined amount of the selectively magnetizable fluid has been returned to the fluid reservoir; and in response to determining that a predetermined amount of the selectively magnetizable fluid has been returned to the fluid reservoir, instructing the pump to stop transferring the selectively magnetizable fluid from the interior of the balloon to the fluid reservoir.

12. The computer-implemented method of claim 9, wherein the selectively magnetizable fluid includes a plurality of ferromagnetic particles which are suspended in a carrier fluid, wherein the plurality of ferromagnetic particles are coated with a surfactant.

13. The computer-implemented method of claim 12, wherein the plurality of ferromagnetic particles include a material selected from the group consisting of:

magnetite, hematite, and iron.

14. The computer-implemented method of claim 13, wherein the surfactant includes a compound selected from the group consisting of: oleic acid, tetramethylammonium hydroxide, citric acid, and soy lecithin.

15. The computer-implemented method of claim 9, wherein the shaft is hollow and the conduit is integrated in the hollow portion of the shaft.

16. A method for retrieving a magnetically attracted object from a cavity, comprising:

inserting an electromagnetic shaft into the cavity, wherein at least a portion of the shaft is flexible;

instructing a pump to begin transferring a selectively magnetizable fluid from a fluid reservoir to an interior of an expandable balloon through a conduit which extends between the fluid reservoir and an interior of the balloon, wherein the balloon is coupled to a first end of an electromagnetic shaft;

waiting for the balloon to expand and subsequently return to a deflated state; and retrieving the electromagnetic shaft from the cavity.

17. The method of claim 16, comprising:
instructing a controller to demagnetize the shaft and the selectively magnetizable fluid in response to retrieving the electromagnetic shaft from the cavity.

18. The method of claim 16, wherein the selectively magnetizable fluid includes a plurality of ferromagnetic particles which are suspended in a carrier fluid, wherein the plurality of ferromagnetic particles are coated with a surfactant.

19. The method of claim 18, wherein the plurality of ferromagnetic particles include a material selected from the group consisting of: magnetite, hematite, and iron, wherein the surfactant includes a compound selected from the group consisting of: oleic acid, tetramethylammonium hydroxide, citric acid, and soy lecithin.

20. The method of claim 16, wherein the shaft is hollow and the conduit is integrated in the hollow portion of the shaft.

* * * * *